United States Patent [19]

Leonhart

[11] 4,026,649

[45] May 31, 1977

[54] PORTABLE PROCESSING STATION

[75] Inventor: Charles J. Leonhart, Carol Stream, Ill.

[73] Assignee: Nuarc Company, Inc., Chicago, Ill.

[22] Filed: Nov. 26, 1975

[21] Appl. No.: 635,614

[52] U.S. Cl. .............................. 355/27; 160/267 R

[51] Int. Cl.² .................... G03B 27/32; A47H 3/00

[58] Field of Search .................. 355/27, 72, 61, 62, 355/60; 354/76, 83; 52/36; 312/257 A, 257 SM, 257 SK, 209; 160/242, 267, 267 G, 271, 272

[56] References Cited

UNITED STATES PATENTS

| | | | |
|---|---|---|---|
| 1,270,656 | 6/1918 | Pedo | 160/271 X |
| 1,451,159 | 4/1923 | Greene | 354/76 |
| 1,550,237 | 8/1925 | Beckman | 160/267 X |
| 2,270,978 | 1/1942 | Swormstedt | 160/267 |
| 3,269,265 | 8/1966 | Polland | 355/72 |
| 3,308,714 | 3/1967 | Friedel | 355/60 |
| 3,421,568 | 1/1969 | Youngs | 160/267 X |
| 3,424,530 | 1/1969 | Leonhart | 355/61 |
| 3,425,171 | 2/1969 | Propst et al. | 52/36 |
| 3,751,737 | 8/1973 | Mustee | 52/36 X |
| 3,811,767 | 5/1974 | Purnell | 355/27 |
| 3,870,388 | 3/1975 | Lofgren | 312/257 A |

*Primary Examiner*—Donald A. Griffin
*Attorney, Agent, or Firm*—Mason, Kolehmainen, Rathburn & Wyss

[57] ABSTRACT

A portable processing station comprising an enclosure having a bottom wall, a top wall, a pair of side walls, a rear wall and a front wall defining an entrance opening, said walls being formed of strong, thin sheet material with integral flange means for joining adjacent ends of said walls forming light tight joints therebetween, a light tight entrance curtain for opening and closing said entrance and means for causing a flow of ventilating air through said enclosure when said entrance curtain is closed.

9 Claims, 7 Drawing Figures

PORTABLE PROCESSING STATION

BACKGROUND OF THE INVENTION

Field of the Invention

The present invention relates to a portable processing station or dark room and more particularly a dark room which is especially adapted for use with relatively large cameras such as the copy or process cameras shown in U.S. Pat. Nos. 3,765,761 and 3,424,530, which patents are assigned to the same Assignee as the present application. In relatively large process cameras and other cameras often used in the graphic arts industry, such as shown in the aforementioned patents it is desirable to provide a portable processing station or dark room which can be interconnected and directly associated with the film support assembly at the business end of the camera so that film can be processed rapidly within the light tight enclosure of the dark room or process station. This arrangement minimizes the possiblity of an inadvertent exposure of the film before developing and likewise provides for high production rates not heretofore possible when the camera and dark room are a considerable distance apart.

Moreover, because the processing station is portable and relatively light in weight, it may be readily moved with the camera when desired and in addition the dark room is much more economical to initially purchase and operate than a conventional dark room which usually occupies a special portion of a conventional building structure. Thus, a camera and portable processing station in combination in accordance with the present invention may be readily moved around to different offices in a building for use in different jobs without requiring extensive remodeling of the building. The processing station or dark room may also be used alone for developing films from all types of cameras whenever desired.

It is another object of the present invention to provide a new and improved portable processing station or dark room.

Another object of the invention is to provide a new and improved portable processing station especially adapted for use in combination with process or copy cameras of the type shown and described in the aforementioned patents.

Still another object of the invention is to provide a new and improved camera-dark room combination of the character described.

Yet another object of the present invention is to provide a new and improved portable dark room which is relatively low in cost, light in weight, and easy and convenient to operate.

Still another object of the present invention is to provide a new and improved portable processing station or dark room of the character described having a novel light tight entrance curtain for opening and closing the entrance to the dark room and thus providing a light tight enclosure when the curtain is in the closed position.

SUMMARY OF THE INVENTION

The foregoing and other objects and advantages of the present invention are accomplished in an illustrated embodiment which comprises a portable processing station or dark room especially adapted for use in combination with a process or copy camera, for example as shown and described in the aforementioned patents.

The dark room or processing station includes an enclosure having a bottom wall, a top wall, a pair of side walls, a rear wall and a front wall defining an entrance opening, and the walls are formed of strong, thin sheet material with integral flange means for joining adjacent edges of the walls to form a light tight joint for the complete enclosure. A light tight entrance curtain is provided for opening and closing the entrance in the front wall and means is provided for causing a flow of ventilating air through the enclosure when the entrance curtain is in a closed condition. Suitable wiring is built into the processing station for powering safe lights and other auxiliary equipment which might be utilized in the processing station. A novel light tight entrance curtain assembly is relatively low in cost, reliable in operation and light in weight to provide a unique dark room which is extremely handy and portable.

DESCRIPTION OF THE PREFERRED EMBODIMENT

Figure 1:
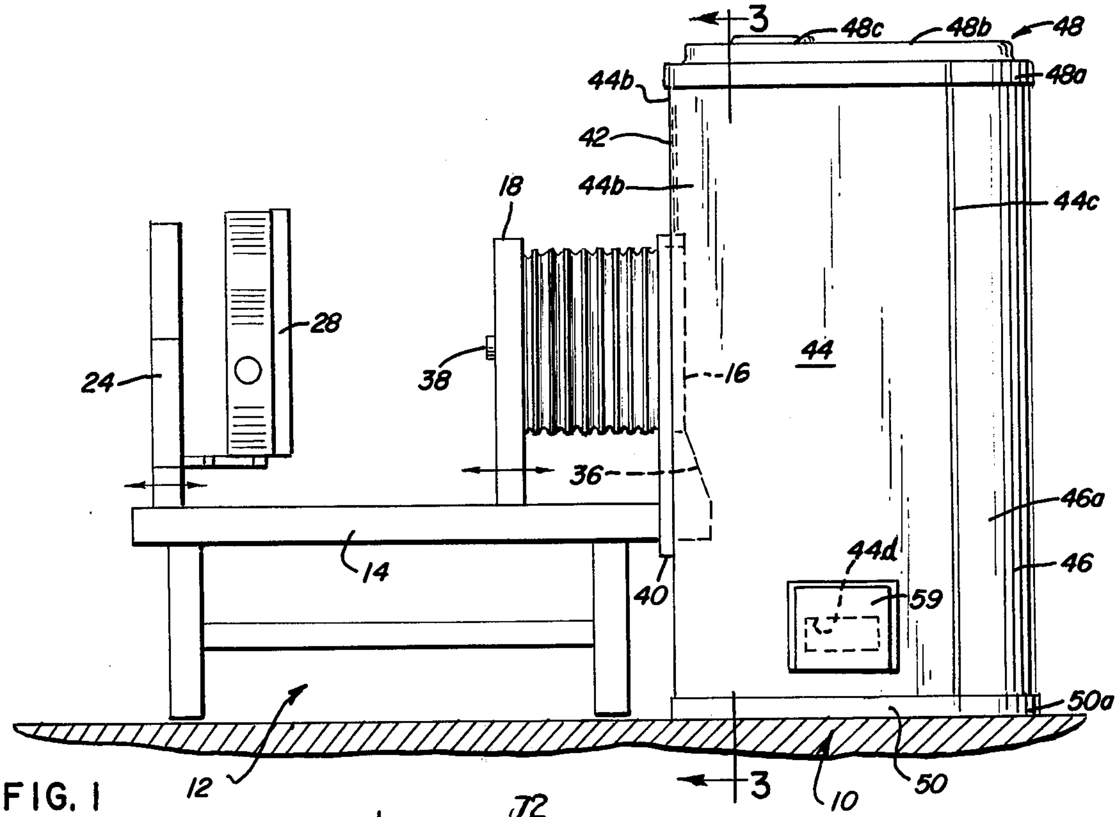
FIG. 1 is a side elevational view of a new and improved portable processing station in accordance with the features of the present invention in combination with a process or copy camera of the type shown in the aforementioned patents.
Figure 2:
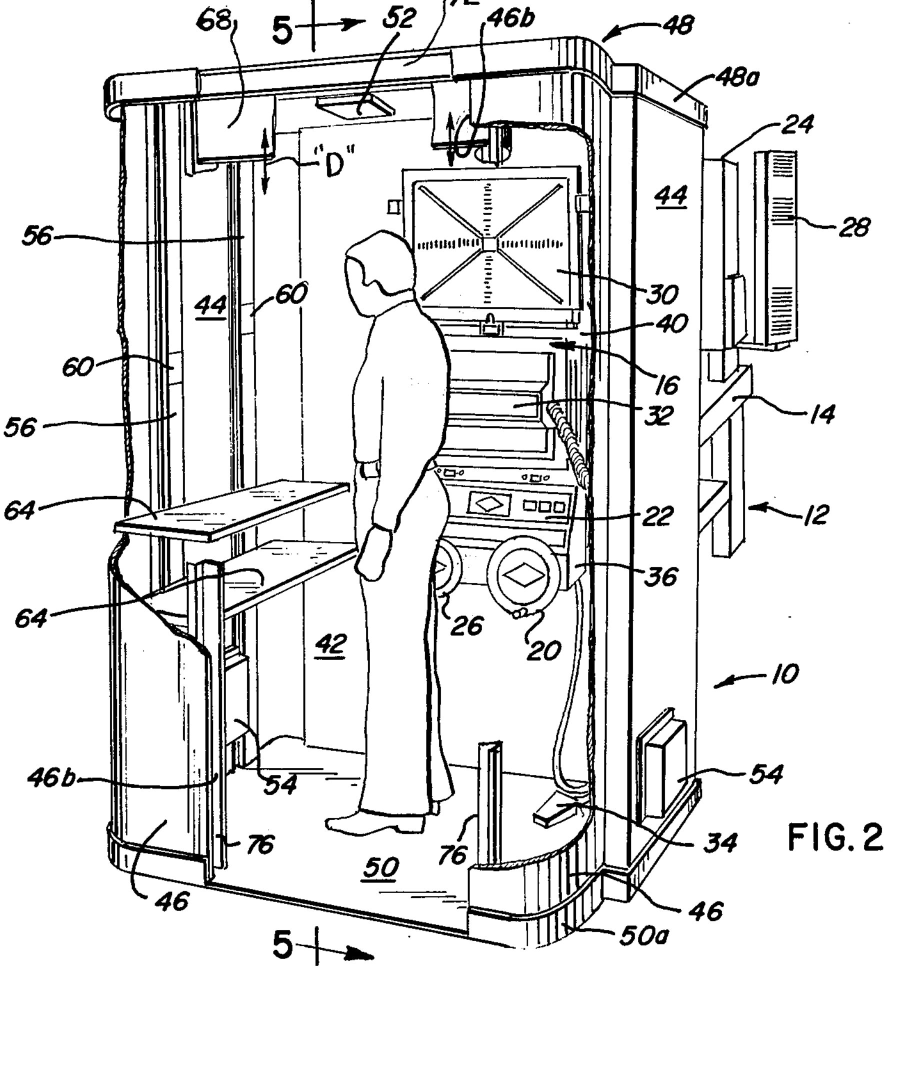
FIG. 2 is a perspective elevational view of the combination of FIG. 1 with portions broken away showing the interior of the processing station and the film support and control assembly of the process camera operable from within the dark room.

Referring now more particularly to the drawings, therein is illustrated a new and improved portable processing station or dark room constructed in accordance with the present invention and referred to generally by the reference numeral 10. The processing station or dark room may be used separately or in combination with a process or copy camera 12 of the type shown and described in the aforementioned patents and reference to these patents should be had for a more detailed consideration of the operational features of the cameras. In general, the camera 12 includes a horizontal bed structure 14 with a film holding assembly 16 at one end adjacent the portable dark room 10 (as best shown in FIGS. 1 and 2). A lens support assembly 18 is mounted for movement along the bed structure 14 and the position on the bed is accurately and precisely controlled from within the dark room 10 by means of a hand wheel 20 and read out information 22 adjacent the film holding assembly 16. The camera also includes a copy support structure 24 mounted for movement along the bed 14 and precisely controlled by means of a hand wheel 26 and a read out mechanism similar to the mechanism 22.

Suitable illuminating lights 28 are supported from the copy support assembly and are adjustable in position and intensity to provide for the proper illumination of the material on the copy board so that precision photographs can be obtained on the film or film pack carried in the film holding assembly of the camera. The camera also includes an image viewing ground glass 30 and vacuum assembly 32 to provide for accurate positioning and holding of the film in the camera and the vacuum frame is controlled by a foot pedal 34 which provides control for a vacuum pump (not shown). The film support assembly 16 is at the operating or business end of the camera and is associated with a control panel 36 for controlling the operation of the camera. A lens and shutter assembly 38 is carried on the lens support structure 18.

Figure 3:
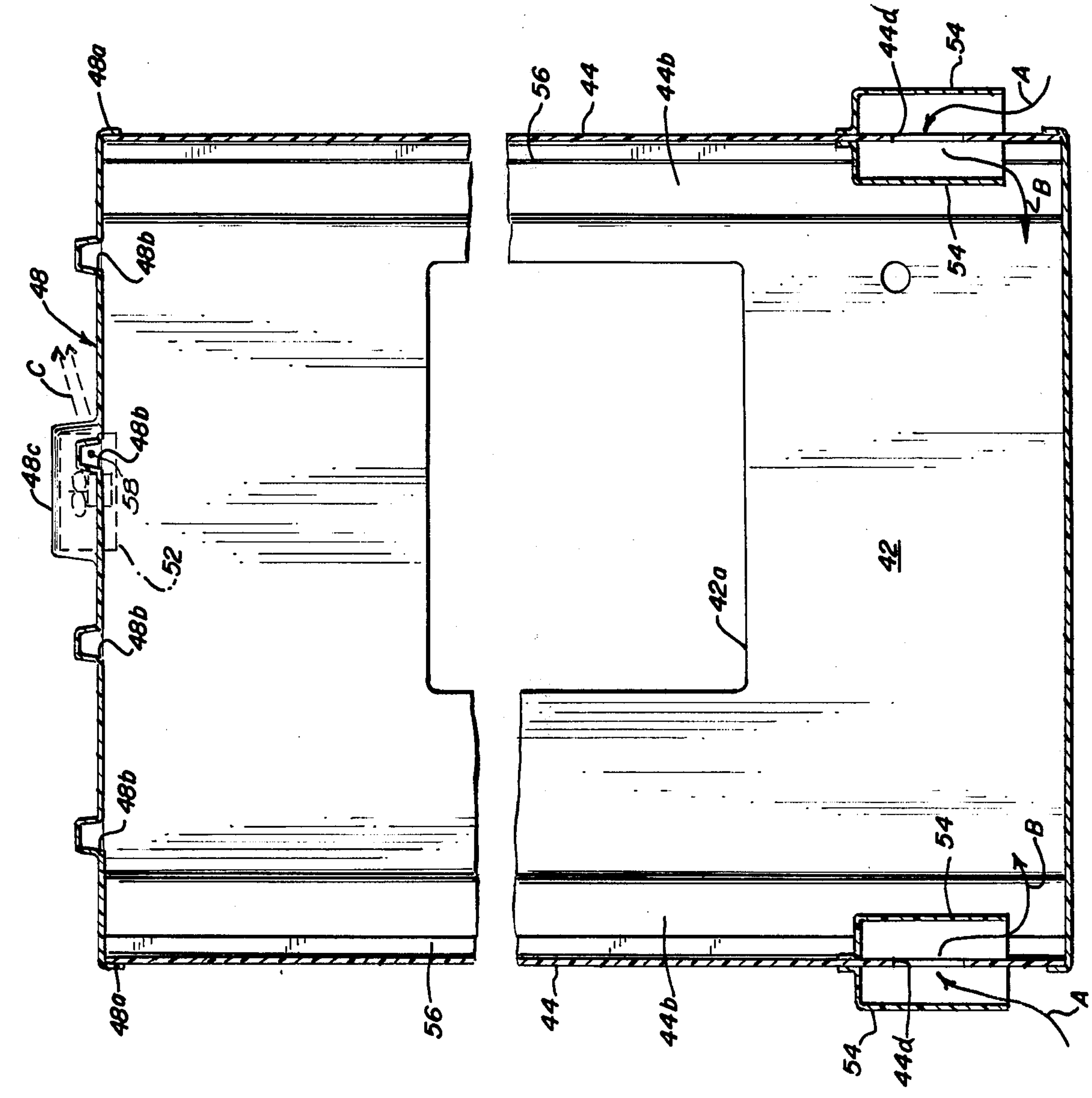
FIG. 3 is a vertical sectional view take substantially along lines 3—3 of FIG. 1.

The film holding assembly 16 and associated control equipment is provided with a surrounding rectangular frame 40 adapted to provide a light tight interconnection between the camera 12 and a rear wall 42 of the portable dark room having a rectangular opening 42*a* suitably dimensioned to accommodate the control end of the process camera 12 (as best shown in FIG. 3). When the dark room is used without a camera, the opening is covered over with a removable cover. Preferably, the rear wall 42 and other walls of the dark room are formed of light weight, strong, plastic sheet material such as fiber glass reinforced polyester resin or acrylic resin and the walls are colored with a suitable pigment to form a light tight walled enclosure of the portable dark room.

Figure 6:
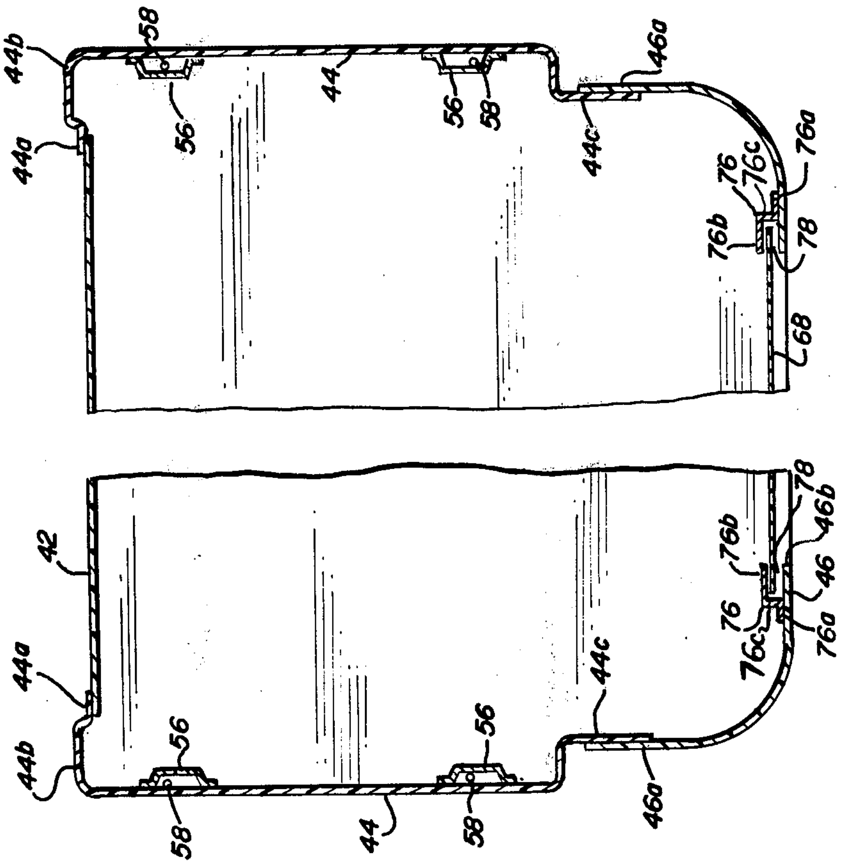
FIG. 6 is a horizontal sectional view taken substantially along lines 6—6 of FIG. 5.

Preferably the rear wall is of rectangular shape as shown, and is joined along its longitudinal side edges to flange portions 44*a* formed on an inturned web structure 44*b* of a pair of opposite side walls 44 (as best shown in profile in FIG. 6). Along the forward longitudinal edges of the side walls 44, there is provided an integrally formed inturned forward extending edge flange portion 44*c*adapted to be interconnected or joined with side flange sections 46*a* on a front wall 46 of the portable dark room.

The upper end or top of the portable dark room 10 is covered by means of an integrally molded roof or top wall 48 having a down turned peripheral flange 48*a* shaped to match the profile or cross-section (as shown in FIG. 6). This flange is adapted to interconnect and join the upper edges of the vertical panels 42, 44 and 46 in a light tight joint. The dark room also includes a similar, integrally molded bottom wall or floor panel section 50 having an upstanding peripheral flange 50*a* adapted to join with the lower edges of the vertical walls 42, 44 and 46 to form a light tight joint around the bottom of the enclosure. Preferably, the top wall and floor wall sections are formed in an integral molding process from suitable sheet material and are profiled to match the cross-sectional shape of the portable dark room (as best shown in FIG. 6). The flanged interconnection between the side walls and the floor and the top wall provide for a light tight peripheral joint between all of the wall sections and in addition provide suitable stiffening to provide a relatively strong yet light in weight portable dark room enclosure. Additional stiffness for the roof or top wall section 48 is provided by a plurality of integrally molded hollow ridges 48*b* extending laterally across the wall structure and an integrally molded fan housing section 48*c* is provided having an exhaust opening therein covered by a screen for enclosing an exhaust fan 52 (dotted lines, FIG. 3) for ventilating the Portable dark room.

Each of the side walls 44 is formed with a ventilation inlet opening 44*d* adjacent the lower end to provide for the inlet of fresh air when the dark room is closed with the exhaust fan in operation. Each of the openings 44*d* is hooded on inside and outside surfaces of the side wall with a flanged enclosure or hood structure 54 having a lower open end and adapted to provide a light tight shield for the opening 44*d* while permitting the inflow of fresh air as shown by the arrows "A" and "B" in FIG. 3. As shown in FIGS. 1, 2 and 3, the ventilation hoods 54 are formed with flanges along the upper end on opposite sides and these flanges are secured to the adjacent surfaces of the side walls 44 around the sides and upper edge of the ventilation openings 44*d*. As best shown in FIG. 3, the exhaust fan 52 pulls outside air through the vent openings 44*d* adjacent the lower portion of the dark room enclosure and discharges the air out through an opening formed in the integral fan housing 48*c* in the roof section 48 (as shown by the dotted arrow "C").

Each side wall 44 is provided with a pair of elongated channels 56 (as shown in section in FIG. 6) and each channel has a pair of flanges along opposite edges attached to the inside surfaces of the side wall. The channels may be formed of metal or plastic material and provide additional stiffness for the side wall. As shown in FIG. 6, the channels also provide a conduit or space for electrical wires 58 and one or more convenient outlets 60 are mounted at appropriate levels (FIG. 2) on the channels for powering any auxiliary equipment used in the dark room.

The integrally formed ridges or ribs 48*b* in the top wall 48 provide conduits for the electrical wiring used for powering one or more bubble type safe lights mounted on the ceiling and the vent fan 52. These safe lights may be of the type as shown and described in U.S. Pat. Des. No. 204,682, which patent is assigned to the same assignee as the present application. The flanged channels 56 also provide structural support for one or more work shelves 64 removably attached thereto at convenient levels for supporting any auxiliary equipment such as a diffusion transfer copier process or an accessory tray, etc.

In accordance with the present invention, the portable dark room 10 includes a novel, light tight entrance curtain assembly generally indicated by the reference numeral 66 and adapted to open and close the relatively large rectangular entrance opening 46*b* formed in the front wall 46 of the dark room. The entrance opening 46*b* extends upwardly from the base or floor section 50 and is large enough to accommodate an average size person and the upper edge of the opening is spaced below the ceiling or roof section 48 (as best shown in FIG. 2). The curtain assembly 66 is shown in exploded detail in FIGS. 4 and 7 and includes a curtain 68 of opaque, light impervious, flexible plastic material which is carried in a roll on a roller 70 supported for axial rotation at opposite ends within a rectangular box or roll housing 72. The housing is open at the bottom and includes opposite end walls 74 which support pivot axles on the opposite ends of the roller. The roller housing is supported adjacent the upper end of a pair of vertical, channel forming side members 76 of generally Z-shaped cross-section and including outer flanges 76*a* attached to the inside surface of the front wall panel 46.

Figure 5:
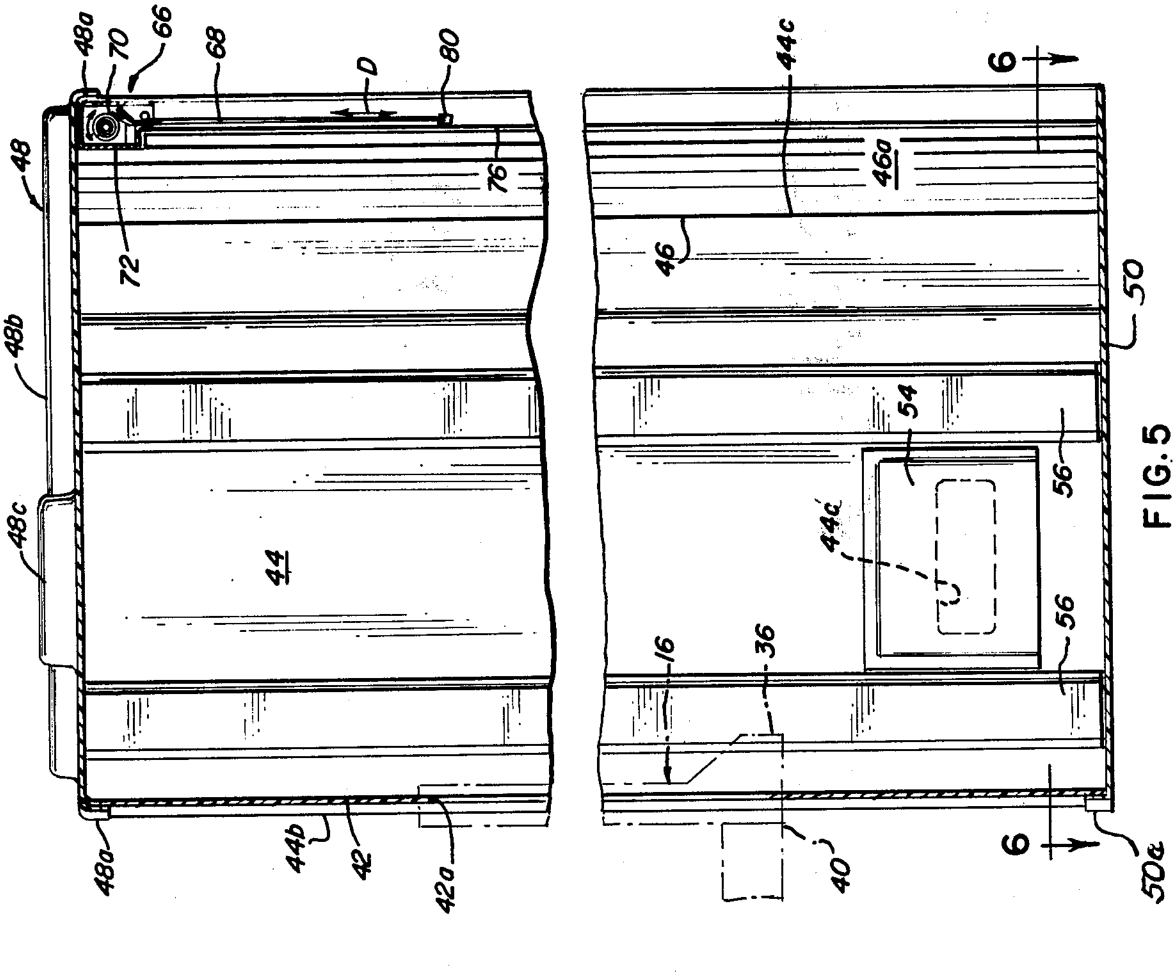
FIG. 5 is a vertical sectional view taken substantially along lines 5—5 of FIG. 2.

The flanges are attached inwardly of the opposite side edges of the entrance opening 46b (as best shown in FIG. 6). The channel forming members 76 add stiffness to the wall structure around the entrance opening 46b and include inside flanges 76b spaced inside and parallel of the inside surfaces of the front wall 46. The members 76 in combination with the front wall form guide channels 78 on opposite sides of the entrance opening to accommodate the marginal edge portions of the flexible curtain 68 as the curtain slides as shown by the arrow "D" in FIGS. 5 and 7.

In order to provide some tension on the flexible curtain 68 and to stiffen and guide the lower edge thereof a curtain bar 80 is carried along the lower edge of the curtain 68 and when the curtain is closed, the bar rests against the lower floor section 50 to provide a close, light tight joint therewith. Opposite side edge portions of the curtain 68 slide within the channels 78 formed in the structural channel forming members 76 and the front wall 46 in a light tight joint around the edges of the entrance opening 46b.

Figure 4:
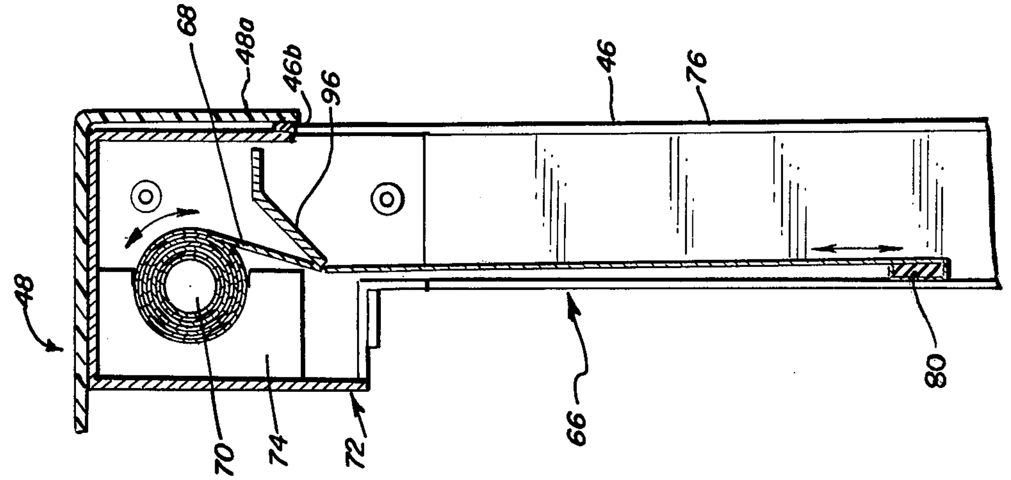
FIG. 4 is a fragmentary enlarged vertical sectional view adjacent the entrance opening of the processing station illustrating the new and improved light tight entrance curtain in accordance with the features of the present invention.
Figure 7:
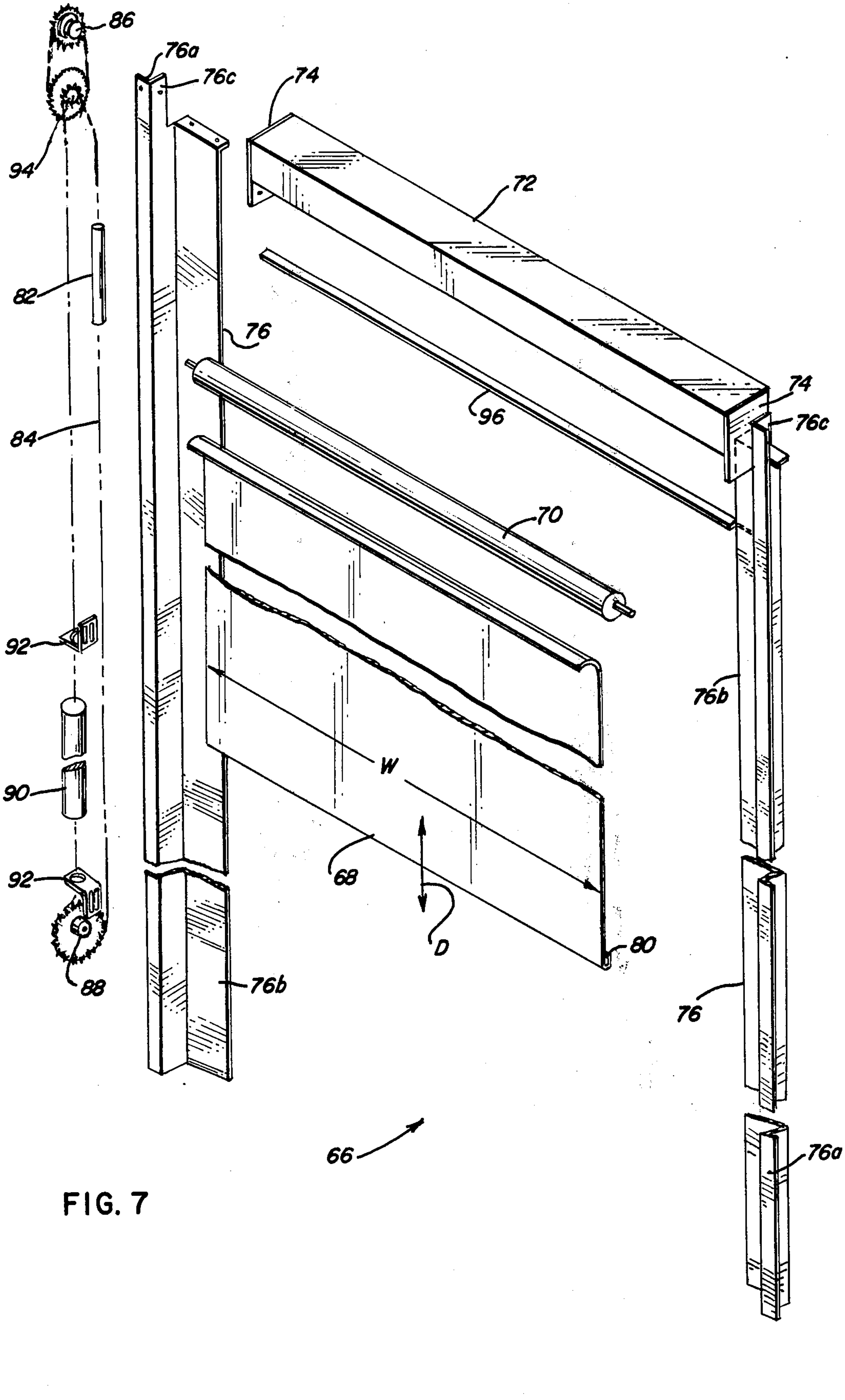
FIG. 7 is an exploded perspective view of the light tight curtain assembly in accordance with the features of the present invention.

The end walls 74 of the roller housing 72 are attached to intermediate web portions 76c of the channel forming members 76 and the curtain 68 is dimensioned with a width "W" which is greater than the spacing between the opposite facing edge portions of the flanges 76b. Operation of the light tight entrance curtain 68 is controlled from inside the portable dark room 10 by means of an elongated control handle 82 which is mounted on an endless belt or cord 84 entrained around a smaller pulley of an idler pulley cluster 94 adjacent the upper end of the curtain assembly and an idler pulley 88 adjacent the lower end. A counter-balance rod 90 is mounted on the endless belt 84 and slides within openings formed in a pair of angle brackets 92 which are mounted on the web portions 76c of one of the structural members 76 at the edge along the entrance opening. The rod 90 acts as a counter-balance to offset the weight of the unrolled curtain so that only minimal forces are needed to raise or lower the curtain. A second endless belt 84A is entrained around a gear wheel 86 mounted on an axle of the support roller 70, and around the larger pulley of the cluster 94 so that movement of the handle 82 in an upward direction causes the roller 70 to rotate and wind or roll up the flexible curtain 68 like a shade. The larger and smaller pulleys of the cluster have a diameter ratio of about 3 to 1 to provide for rapid movement of the curtain up or down. Movement of the handle 82 in a downward direction unrolls the flexible curtain letting the weight of the material and the bar 80 help carry the curtain downwardly with the edge portions of the curtain loosely sliding in the channel sections 78 on opposite sides of the entrance opening. As best shown in FIGS. 4 and 7, the flexible curtain 68 is guided onto and off of the roll 70 by a guide vane 96 which slopes inwardly and downwardly to engage the outside face of the curtain.

The present invention provides a system wherein film exposed by the camera 12 can be directly and rapidly processed in the portable dark room 10. After unloading of the film from the film support assembly 16, the film processing can commence without ever leaving the light tight enclosure. The safe lights and other equipment useful in processing the film are immediately available and the convenience outlets and adjustable shelves are handy features in the dark room. The portable dark room may be utilized without a camera and in this case, a suitable cover wall is provided over the camera opening 42a. The dark room unit is light in weight, easily portable and economical in initial cost and operation. Because of the convenience, much higher production rates for camera copy can be obtained in the combination process camera and dark room. The chance of an inadvertent exposure of the film is virtually eliminated with the novel combination with the present invention.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A portable processing station comprising:

an enclosure having a bottom wall, a top wall, a pair of side walls, a rear wall and a front wall defining an entrance opening, said walls being formed of strong thin sheet material;

integral flange means for joining adjacent edges of said walls forming light tight joints therebetween;

a light tight entrance curtain for opening and closing said entrance;

said entrance curtain comprising a sheet of light tight impervious flexible material rollable on a roller adjacent an upper edge of said entrance opening and including opposite edges slidable within channel means disposed along opposite sides of said entrance opening forming a light tight joint with said front wall when said curtain is in a closed position;

tension means for exerting tension on said curtain, control means for rolling and unrolling said curtain on said roller to open and close said entrance including a flexible member movable up and down adjacent one side of said entrance; and means for causing a flow of ventilating air through said enclosure when said entrance curtain is closed.

2. The portable processing station of claim 1 in combination with a camera having a film support assembly and control system adjacent one end, and means defining a camera opening in said rear wall for receiving said film support assembly and control system of said camera.

3. The portable processing station of claim 1, wherein said last mentioned means includes an exhaust fan mounted adjacent an upper end of said enclosure, at least one vent opening defined in one of said walls, and light shielding hood means over said opening for directing air flow and preventing light from entering said enclosure.

4. The portable processing station of claim 1 including at least one elongated member of channel shaped cross-section secured to the inside surface of one of said walls for stiffening the same and forming a conduit passage for electrical wiring.

5. The portable processing station of claim 4 including a pair of said enlongated members secured in vertical parallel arrangement on said one wall, and shelf means secured to said pair of elongated members.

6. The portable processing station of claim 4 including at least one convenience outlet mounted on said elongated member.

7. A light tight entrance curtain assembly for dark rooms and the like, having an entrance opening, said entrance curtain assembly including a curtain of light impervious flexible material mounted on a roll adjacent an upper edge of said entrance opening, channel guide means along opposite sides of said entrance opening for receiving marginal edge portions of said curtain in sliding engagement therein when said curtain is closed by unrolling from said roll, means adjacent a lower edge of said curtain extending between opposite sides of said entrance opening for exerting tension on said curtain, and control means for rolling and unrolling said curtain to open and close said entrance opening including an elongated flexible member mounted in vertical alignment adjacent one side of said entrance opening and movable up and down to open and close said curtain.

8. The entrance curtain assembly of claim 7 wherein said last mentioned means includes an endless belt interconnected to turn said roll and including a handle on said belt.

9. The entrance curtain assembly of claim 8 including counter-balance means on said belt for at least partially offsetting the weight of said entrance curtain as it is unrolled from said roll.

* * * * *